(12) United States Patent
Yang et al.

(10) Patent No.: US 9,710,153 B2
(45) Date of Patent: Jul. 18, 2017

(54) ELECTRONIC DEVICE AND METHOD OF CONTROLLING THE SAME

(71) Applicant: LG ELECTRONICS INC., Seoul (KR)

(72) Inventors: Yoonseok Yang, Seoul (KR); Sungchae Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 235 days.

(21) Appl. No.: 14/705,836

(22) Filed: May 6, 2015

(65) Prior Publication Data

US 2015/0234565 A1    Aug. 20, 2015

Related U.S. Application Data

(63) Continuation of application No. 13/924,224, filed on Jun. 21, 2013, now Pat. No. 9,055,214.

(30) Foreign Application Priority Data

Feb. 7, 2013    (KR) .................. 10-2013-0013812

(51) Int. Cl.
G06F 3/0488    (2013.01)
G06F 3/042    (2006.01)
G06F 3/0484    (2013.01)
G06F 3/0482    (2013.01)

(52) U.S. Cl.
CPC .......... *G06F 3/0488* (2013.01); *G06F 3/0425* (2013.01); *G06F 3/0482* (2013.01); *G06F 3/04842* (2013.01); *G06F 3/04845* (2013.01)

(58) Field of Classification Search
CPC .. G06F 3/0488; G06F 3/0425; G06F 3/04842; G06F 3/04845
See application file for complete search history.

(56) References Cited

U.S. PATENT DOCUMENTS

| | | | |
|---|---|---|---|
| 2010/0185681 A1* | 7/2010 | Han | G06F 3/04817 707/802 |
| 2011/0022982 A1* | 1/2011 | Takaoka | G06F 3/04817 715/810 |
| 2011/0029635 A1* | 2/2011 | Shkurko | G06F 17/248 709/217 |

* cited by examiner

*Primary Examiner* — Tuan Ho
(74) *Attorney, Agent, or Firm* — Lee, Hong, Degerman, Kang & Waimey PC

(57) ABSTRACT

An electronic device and a method of controlling the same are provided. When the electronic device captures a predetermined number of images through a camera in a predetermined location, the captured images are grouped into a group and a title for the group is recommended. Accordingly, a group title is recommended depending on photographing situation when a user continuously captures images, and thus captured images can be managed more efficiently.

4 Claims, 28 Drawing Sheets

100

100

100

FIG. 25
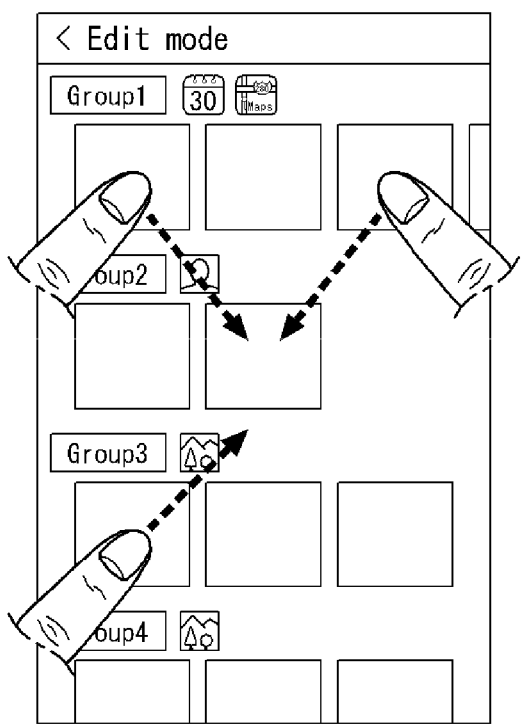
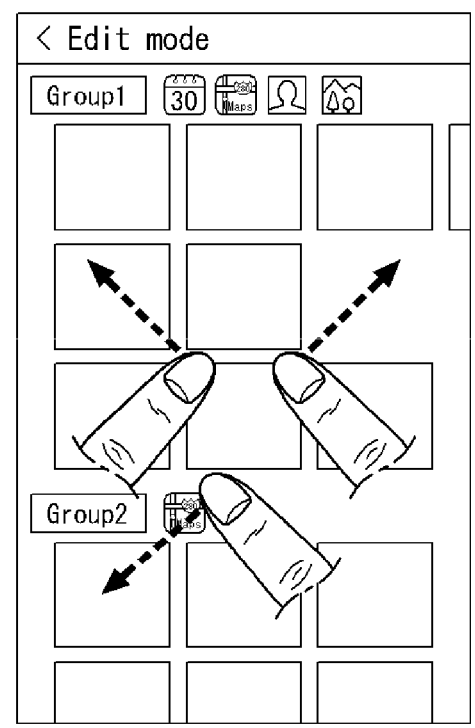

FIG. 26
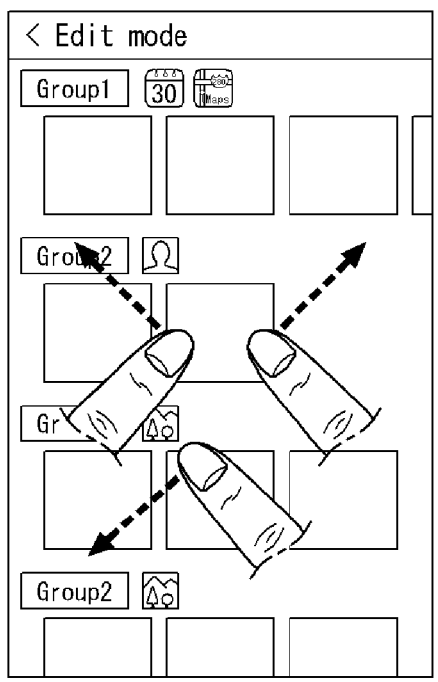  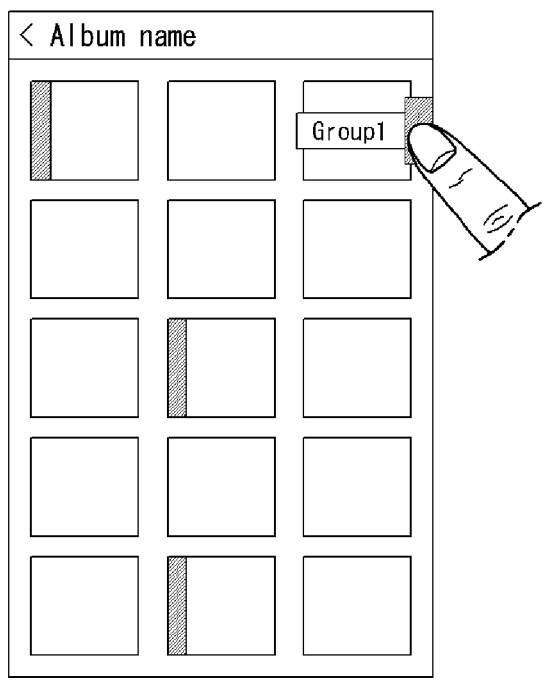

FIG. 27
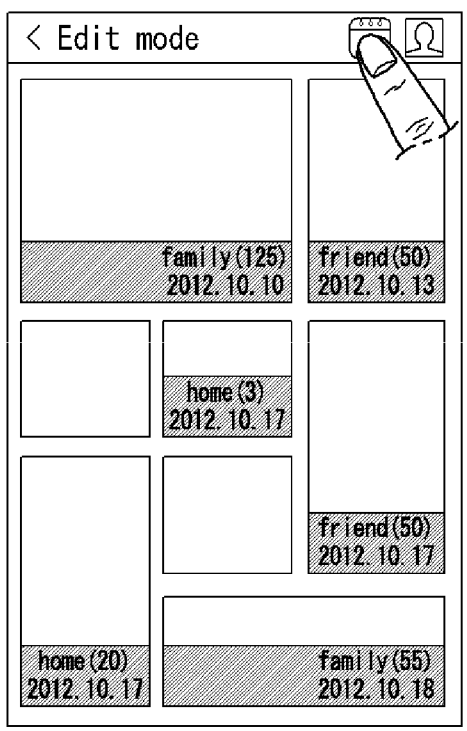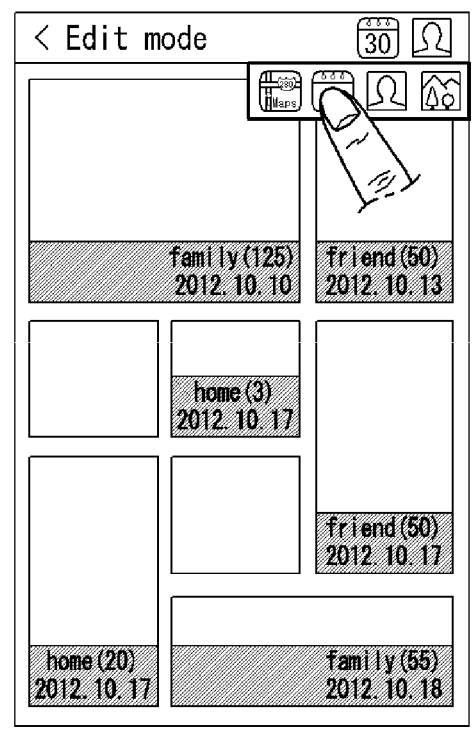

FIG. 28
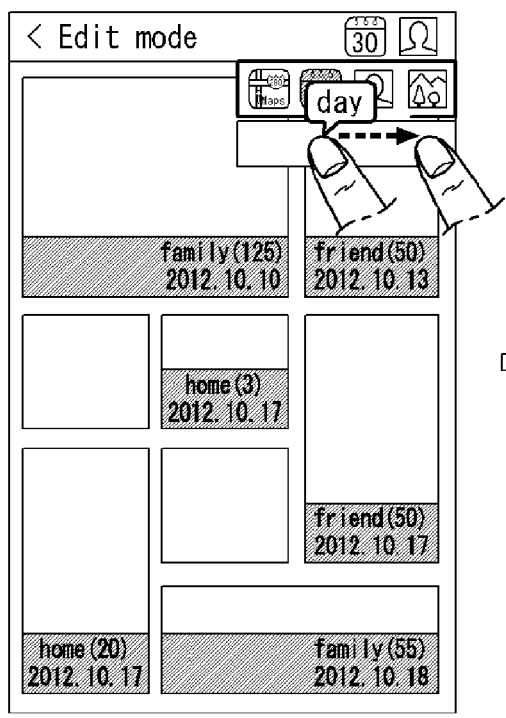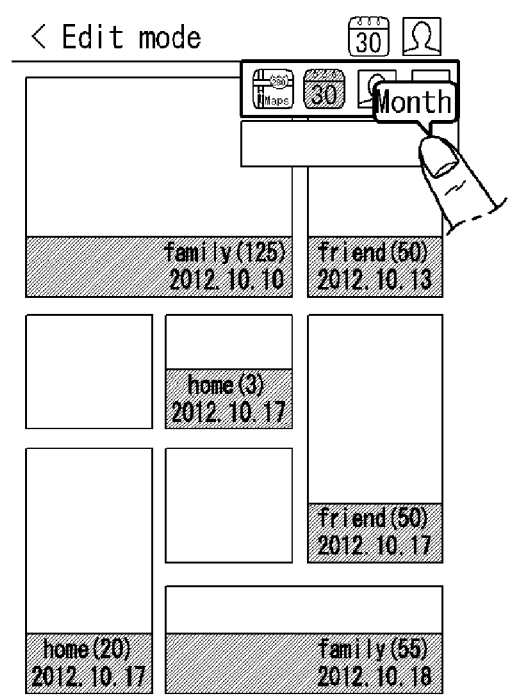

ELECTRONIC DEVICE AND METHOD OF CONTROLLING THE SAME

CROSS REFERENCE TO RELATED APPLICATIONS

This application is a continuation of U.S. patent application Ser. No. 13/924,224, filed on Jun. 21, 2013, now U.S. Pat. No. 9,055,214, which claims the benefit of the earlier filing date and right of priority to Korean Patent Application No. 10-2013-0013812, filed on Feb. 7, 2013, the contents of which are all hereby incorporated by reference herein in their entirety.

BACKGROUND

Field

The present invention relates to an electronic device and a method of controlling the same to manage images captured through a camera more conveniently.

Related Art

As hardware and software technologies related various electronic devices including a mobile terminal are remarkably developed, electronic devices can rapidly provide various type of information to users.

When images are captured through a camera according to conventional technology, a user needs to store all captured images and then manually edit or manage images while viewing stored images.

Accordingly, it is necessary to develop and provide a user interface by which the user can efficiently edit or manage images according to various conditions during or after capturing of images.

SUMMARY

Accordingly, the present invention is directed to an electronic device and a method of controlling the same to group a plurality of images captured through a camera based on various photographing conditions during image capturing and recommend a title of a group image.

An object of the present invention is to provide an electronic device and a method of controlling the same to group a plurality of captured and stored images based on various photographing conditions through simple manipulation and give a title for identifying a group image to the group image.

An electronic device according to one aspect of the present invention includes a camera; a touchscreen; a location information module; and a controller configured to operate the camera to enter an image capture mode, to display a preview region for displaying a preview image input through the camera and a control region for controlling image capture on the touchscreen, to group a plurality of captured images when a predetermined number of preview images are captured while a location of the electronic device, acquired through the location information module, is within a predetermined range, and to display a list of one or more candidate titles for identifying grouped images on the touchscreen.

The control region may include at least one of a capture command region for capturing the preview image, a region for selecting a moving image or a still image, and a region for displaying a thumbnail image of a lastly captured image.

The predetermined range may be set by a user.

Upon reception of an input for selecting one of candidate titles from the list of candidate titles, the controller may display the selected title in the control region.

The controller may match the selected title to the region for displaying a thumbnail image of a lastly captured image in the control region and displays the selected title.

The controller may display a user interface for editing the selected title on the touchscreen upon reception of a predetermined input applied to the selected title displayed being matched to the thumbnail image region.

The controller may display a plurality of images grouped with the selected title on the touchscreen upon reception of an input for selecting the region for displaying a thumbnail image of a lastly captured image.

The electronic device may further include a memory configured to store one or more group images by groups, wherein, when an image is captured through the camera while the selected title is present, the controller controls the captured image to be stored in the group corresponding to the selected title.

The controller may display thumbnail images of a plurality of images captured through the camera on the touchscreen, the thumbnail images including a thumbnail image of at least one group image, wherein the controller changes a display characteristic of the thumbnail image corresponding to the group image to indicate that a predetermined title is mapped to the group image.

The controller may display the list of candidate titles on the touchscreen for a predetermined time.

The controller may display the list of candidate titles on the touchscreen when the predetermined number of preview images are captured until the image capture mode is ended.

An electronic device according to another aspect of the present invention includes: a camera; a touchscreen; and a controller configured to operate the camera to enter an image capture mode, to group a plurality of captured images when a predetermined number of images are captured in the image capture mode and to recommend titles representing grouped images to a user according to a predetermined standard.

An electronic device according to another aspect of the present invention includes a touchscreen, and a controller configured to display a plurality of images captured through a camera on the touchscreen, to categorize the plurality of images into one or more groups based on a predetermined standard upon reception of a predetermined touch input applied to the touchscreen and to give a predetermined title to each group.

A method of controlling an electronic device according to another aspect of the present includes: entering an image capture mode; displaying a preview image input through a camera on a touchscreen; when a predetermined number of images are captured while a location of the electronic device, acquired through a location information module, is within a predetermined range, grouping a plurality of captured images; and displaying a list of one or more candidate titles for identifying grouped images on the touchscreen.

The electronic device and method of controlling the same according to the present invention have the following advantages.

According to the present invention, when images are captured through a camera, the captured images can be grouped based on various photographing conditions during image capture and a title of a group image can be recommended.

Furthermore, it is possible to group a plurality of captured and stored images based on various photographing conditions through simple manipulation and to provide a title for identifying a group image to the group image.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 22 to 28 are views illustrating the embodiment shown in FIG. 21.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
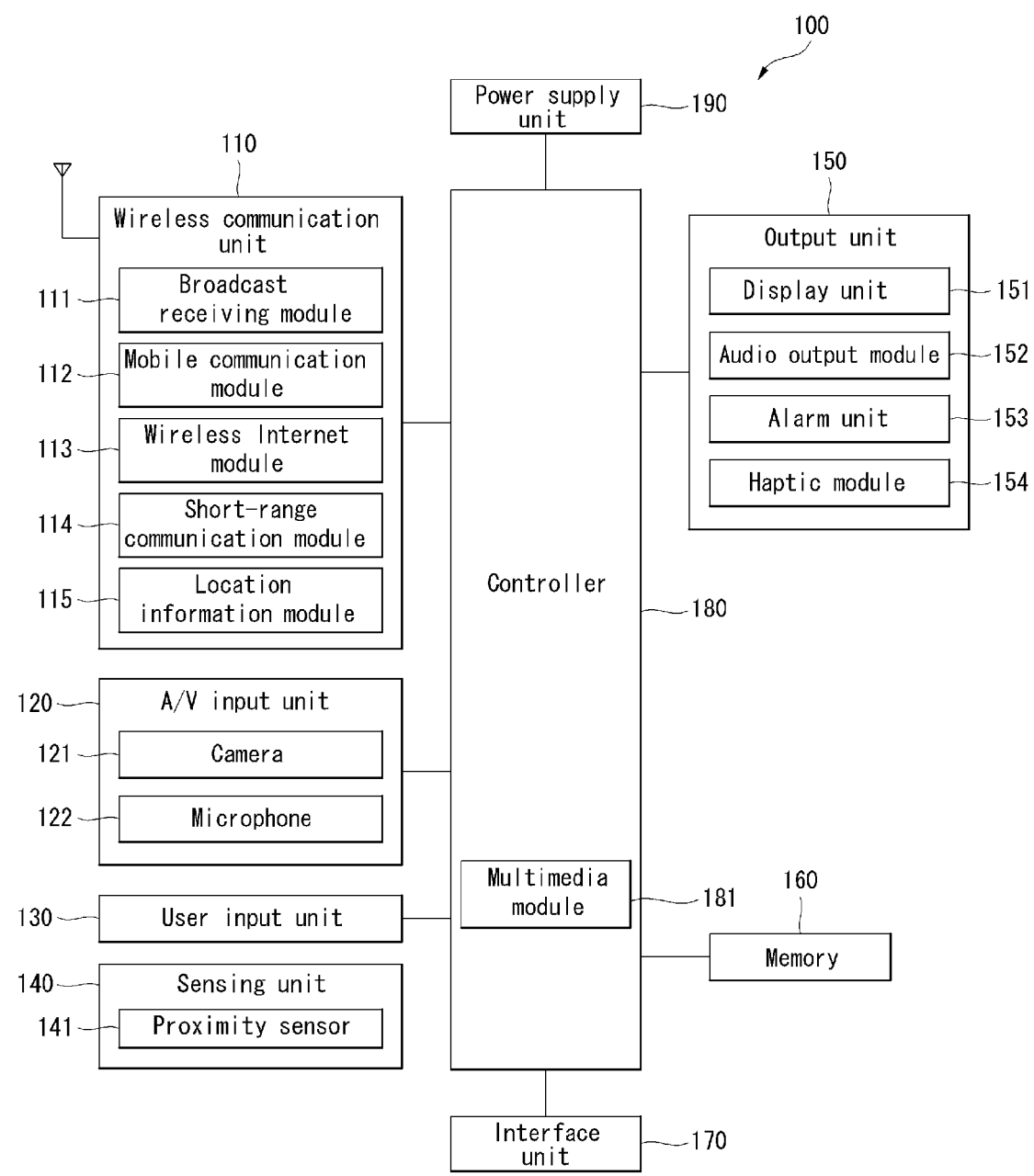
FIG. 1 is a block diagram of a mobile terminal according to an embodiment of the invention.

Referring to FIG. 1, a mobile terminal 100, as an example of the electronic device 100 related to this invention, is described in detail with reference to the accompanying drawings. FIG. 1 is a block diagram of the mobile terminal according to an embodiment of this invention. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a location information module 115. For non-mobile terminals, the wireless communication unit 110 may be replaced with a wired communication unit. The wireless communication unit 110 and the wired communication unit may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. This wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module in non-mobile terminals. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The location information module 115 identifies or otherwise obtains a location of the mobile terminal 100. The location information module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the location information module 115 is a GPS module. The location information module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The location information module 115 continues to calculate a current position in real time and to calculate velocity information based on the position information.

With continued reference to FIG. 1, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated in the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touchscreen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense presence or absence of power provided by the power supply unit 190 or the presence or absence of a coupling or other connection between the interface unit 170 and an external device.

The output unit 150 generates output relevant to the senses of sight, hearing and touch. The output unit 150 may include a display unit 151, an audio output module 152, an alarm 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touchscreen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine, therefore, which portion of the display unit 151 is touched.

With continued reference to FIG. 1, a proximity sensor 141 can be provided within the mobile terminal 100 enclosed by the touchscreen or around the touchscreen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touchscreen is an electrostatic type touchscreen, the proximity sensor 141 may detect proximity of a pointer using a variation of an electric field according to the proximity of the pointer and the touchscreen (touch sensor) may be classified as the proximity sensor 141.

An action in which a pointer approaches the touchscreen without contacting the touchscreen, yet is recognized as being located on the touchscreen, is referred to as a 'proximity touch'. An action in which the pointer actually touches the touchscreen is referred to as a 'contact touch'. The position on the touchscreen proximity-touched by the pointer refers to the position of the pointer that vertically opposes the touchscreen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touchscreen.

The controller 180 (FIG. 1) recognizes the proximity touch as one of various input signals according to proximity depth and position of the pointer. The controller 180 performs various operation controls according to various input signals.

Referring again to FIG. 1, the audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm 153 outputs a signal for announcing an occurrence of a particular event associated with the mobile terminal 100. Typical events include a call signal reception, a message reception, a key signal input and a touch input. The alarm 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is configured to store programs for operation of the controller 180. The memory 160 may temporarily store input/output data (e.g., phonebook, message, still picture, moving picture, etc.). The memory 160 may store data of vibration and sound in various patterns output when the touchscreen receives a touch input.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touchscreen as a character and/or recognizing a picture drawing input performed on the touchscreen as characters or images.

The power supply unit 190 provides power required by the various components for the mobile terminal 100. The power may be internal power, external power, or combinations thereof.

Embodiments of the present invention described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

Figure 2:
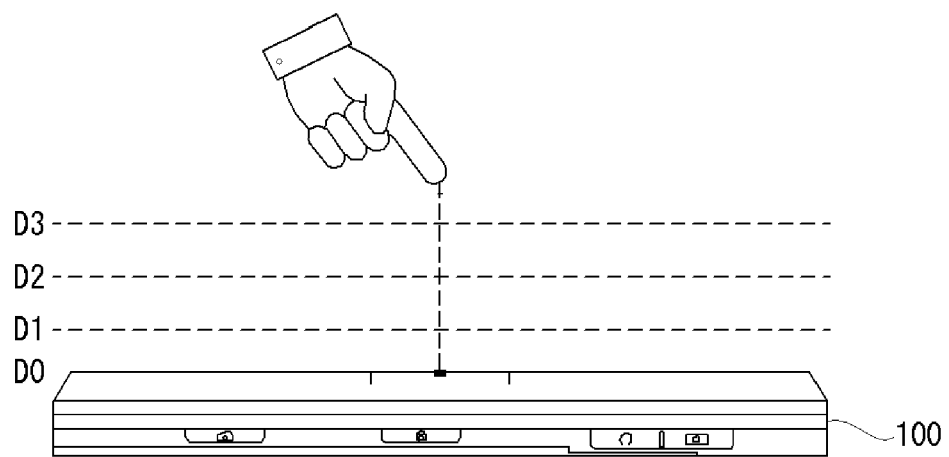
FIG. 2 is a view for explaining a proximity depth of a proximity sensor.

FIG. 2 is a view for explaining a proximity depth of a proximity sensor.

As shown in FIG. 2, when a pointer (such as a user's finger) approaches the touchscreen, the proximity sensor located inside or near the touchscreen may sense the approach of the pointer, and may output a proximity signal.

The proximity sensor may be constructed such that the proximity sensor outputs a proximity signal according to a distance between the pointer approaching the touchscreen and the touchscreen (referred to as "proximity depth").

The distance in which the proximity signal is output when the pointer approaches the touchscreen may be referred to as a detection distance. The proximity depth may be determined by using a plurality of proximity sensors having different detection distances and by comparing proximity signals respectively output from the proximity sensors.

FIG. 2 shows a section of the touchscreen in which proximity sensors capable of sensing three proximity depths may be provided. Proximity sensors capable of sensing less than three or more than four proximity depths may be provided in the touchscreen.

More specifically, when the pointer completely contacts the touchscreen (D0), it may be recognized as contact touch. When the pointer is located within a distance D1 from the touchscreen, it may be recognized as a proximity touch of a first proximity depth. When the pointer is located in a range between the distance D1 and a distance D2 from the touchscreen, it may be recognized as a proximity touch of a second proximity depth. When the pointer is located in a range between the distance D2 and a distance D3 from the touchscreen, it may be recognized as a proximity touch of a third proximity depth. When the pointer is located greater than the distance D3 from the touchscreen, it may be recognized as cancellation of the proximity touch.

Accordingly, the controller 180 may recognize the proximity touch as various input signals according to proximity distance and proximity position of the pointer with respect to the touchscreen, and the controller 810 may perform various operation controls according to the input signals.

Embodiments of the present invention will now be described.

It is assumed that the display unit 151 is a touchscreen for convenience of description. As described above, the touchscreen 151 can perform both the information display function and information input function. However, the present invention is not limited thereto. In the specification, touch can include both contact touch and proximity touch. Touch input means input received by a touch gesture. In addition, it is assumed that a display module 230 of an external device 200 is a touchscreen.

Figure 3:
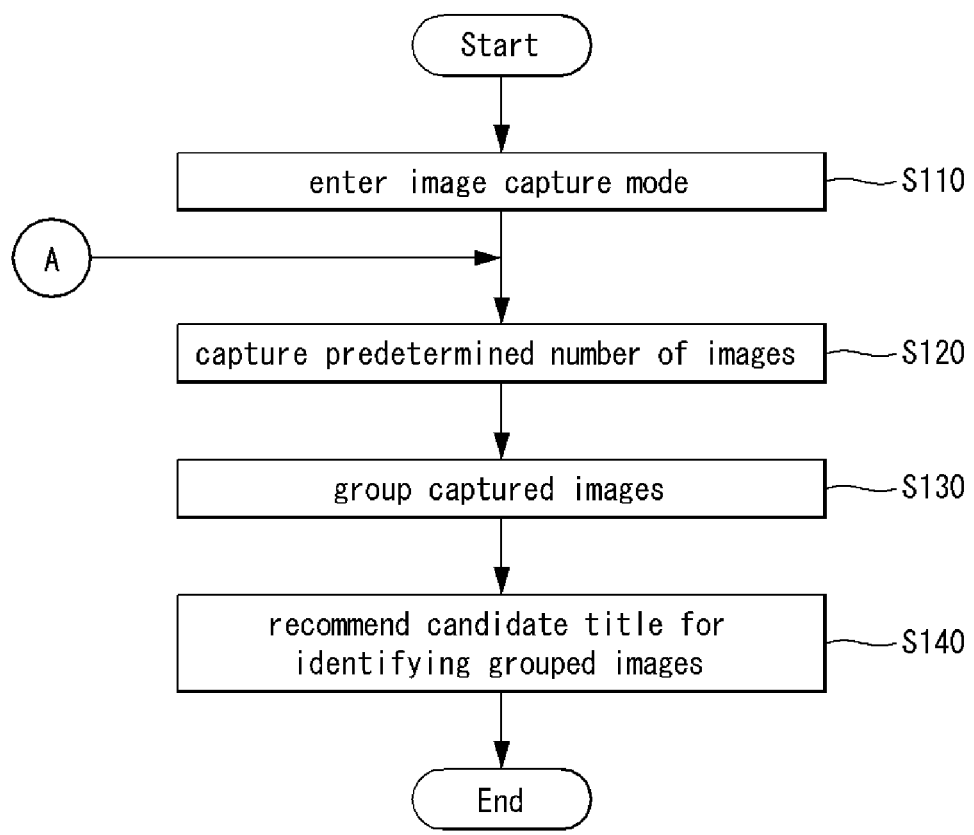
FIG. 3 is a flowchart illustrating a method of controlling an electronic device according to an embodiment of the present invention.

FIG. 3 is a flowchart illustrating a method of controlling an electronic device according to an embodiment of the present invention. The method of controlling an electronic device according to an embodiment of the present invention may be implemented in the electronic device 100 described above with reference to FIGS. 1 and 2. The method of controlling an electronic device according to an embodiment of the present invention and operations of the electronic device 100 to implement the method will now be described with reference to the attached drawings.

Referring to FIG. 3, the controller 180 of the electronic device 100 may enter an image capture mode (S110).

Upon execution of a camera application, the controller 180 operates the camera (121 of FIG. 1) and enters the image capture mode.

Figure 4:
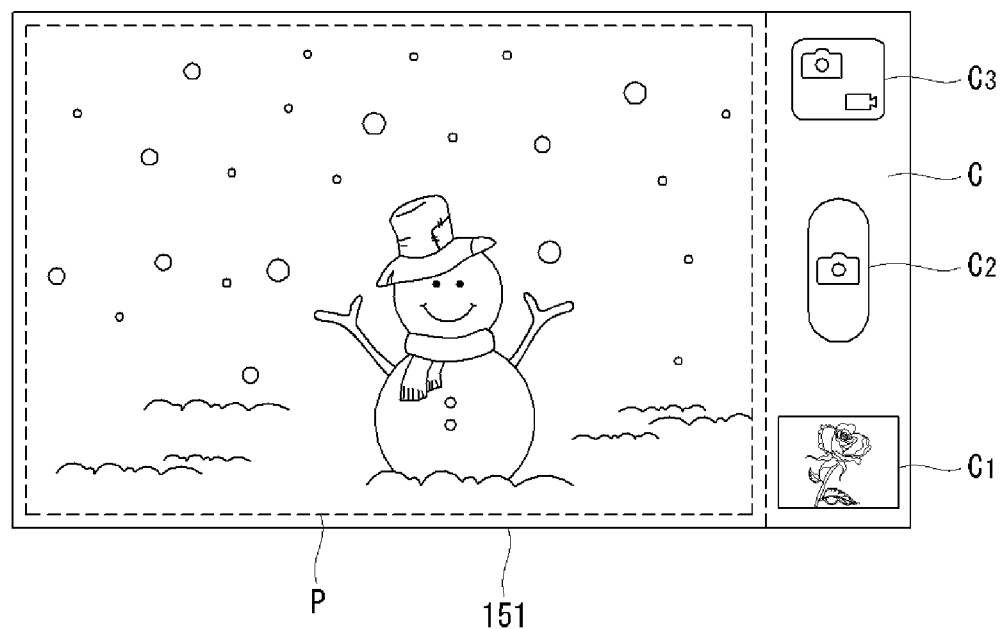
FIG. 4 illustrates an exemplary user interface displayed on a touchscreen in an image capture mode.

FIG. 4 illustrates an exemplary user interface displayed on the touchscreen in the image capture mode.

Referring to FIG. 4, the controller 180 may display the user interface related to image capture on the touchscreen 151 in the image capture mode. The image capture related user interface may include a preview image P acquired through the camera and a control region C for capturing the preview image P.

The control region C may include at least one of a capture command region C2 for capturing the preview image P, a region C3 for selecting a mode for capturing the preview image P as a still image or a moving image, and a region C1 for displaying a thumbnail image of a lastly captured image. The preview image P may be displayed on the overall area of the touchscreen 151 and the control region C may be displayed on at least part of the preview image P.

Referring back to FIG. 3, the controller 180 may capture a predetermined number of images in the image capture mode (S120).

The predetermined number may be twice or more.

The controller 180 may control the electronic device 100 to capture the predetermined number of images in the same place. The same place may mean that a first location of the electronic device 100, acquired at a first time, and a second location of the electronic device 100, acquired at a second time, are within a predetermined area. That is, the first location of the electronic device 100, acquired at the first time, and the second location of the electronic device 100, acquired at the second time, may correspond to the same place.

That is, when a user travels to a specific area and captures a plurality of images in the specific area, the plurality of images can be grouped as a group according to an embodiment of the present invention. Furthermore, the grouped images may be given a title according to an embodiment of the present invention.

Figure 5:
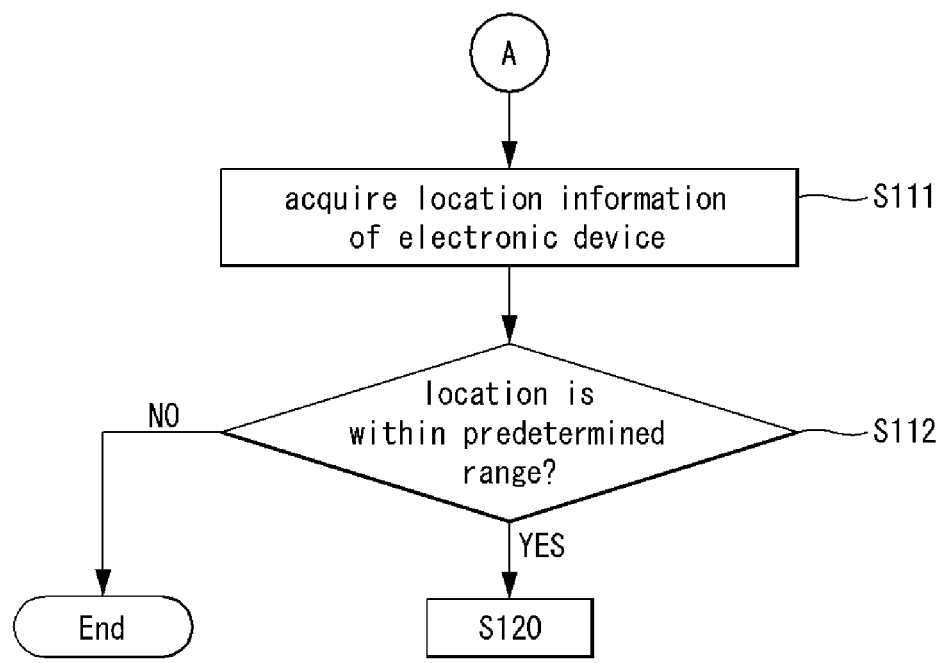
FIG. 5 is a flowchart illustrating step S110 of FIG. 3 in more detail.

FIG. 5 is a flowchart illustrating step S120 of FIG. 2 in more detail.

The controller 180 may acquire information about the location of the electronic device 100 (S111).

The controller 180 may acquire the location information through the location information module 115 of FIG. 1. Upon execution of the camera application, the position-location module (e.g. GPS) can be turned on. The controller 180 may display, on at least part of the control region C of the user interface in the image capture mode, an indicator for indicating that the position-location module is turned on upon execution of the camera application.

The controller 180 may determine whether the acquired location is within a predetermined range (S112).

That is, the controller 180 determines whether the electronic device 100 moves from the currently acquired location of the electronic device 100 within the predetermined range. For example, when the electronic device 100 captures two or more images by operating the camera one time while moving in a specific area, the captured images can be grouped as the same group and a group title for the group can be recommended.

Referring back to FIG. 3, when a predetermined number of images are captured through the camera in a predetermined place, the controller 180 may group the images (S130).

The controller 180 may recommend a candidate title for identifying the grouped images (S140).

According to an embodiment of the present invention, captured images that satisfy a predetermined condition can be automatically grouped and an appropriate group title determined in consideration of the predetermined condition can be automatically mapped to the grouped images and stored.

FIGS. 6 to 9 are views illustrating the embodiment shown in FIGS. 3 and 5.

Figure 6:
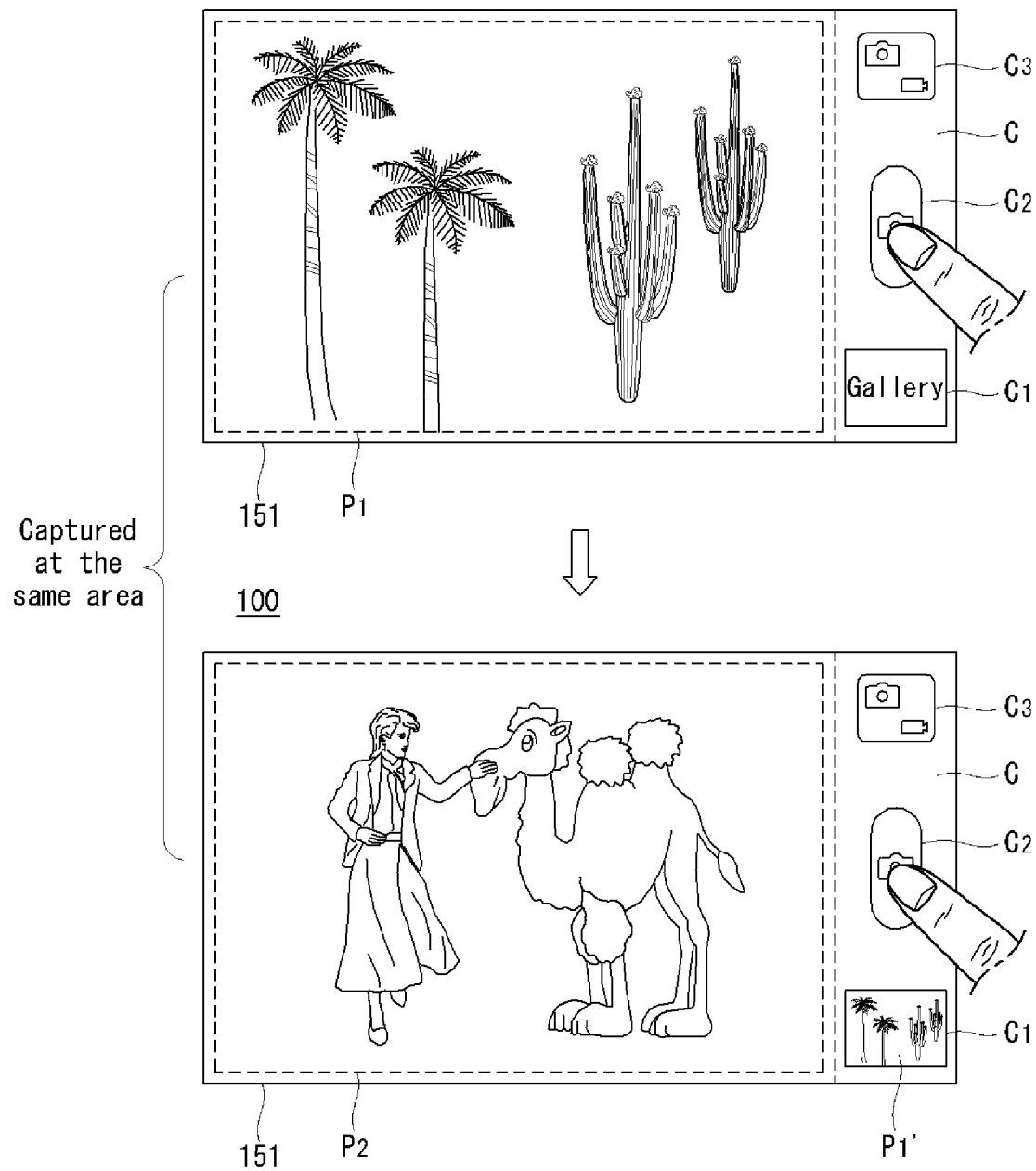
FIGS. 6 to 9 are views illustrating the embodiment shown in FIGS. 3 and 5.

Referring to FIG. 6, the controller 180 may display a first preview image P1 input through the camera (121 of FIG. 1) on the touchscreen 151 in the image capture mode. Upon reception of a touch input applied to the capture command region C2 of the control region C, the controller 180 captures the first preview image P1.

The controller 180 may reduce the captured first preview image and display the captured first preview image P1' in the region C1 for displaying a thumbnail image of a lastly captured image. Then, the controller 180 may display a new second preview image P2 in the preview region. In this case, locations of the electronic device 100 when the first preview image P1 and the second preview image P2 are acquired may be the same place as described above.

The controller 180 may capture the second preview image P2.

That is, the controller 180 may capture a predetermined number of images (e.g. two images) in the same place. The controller 180 may capture a predetermined number of images within a predetermined time.

Figure 7:
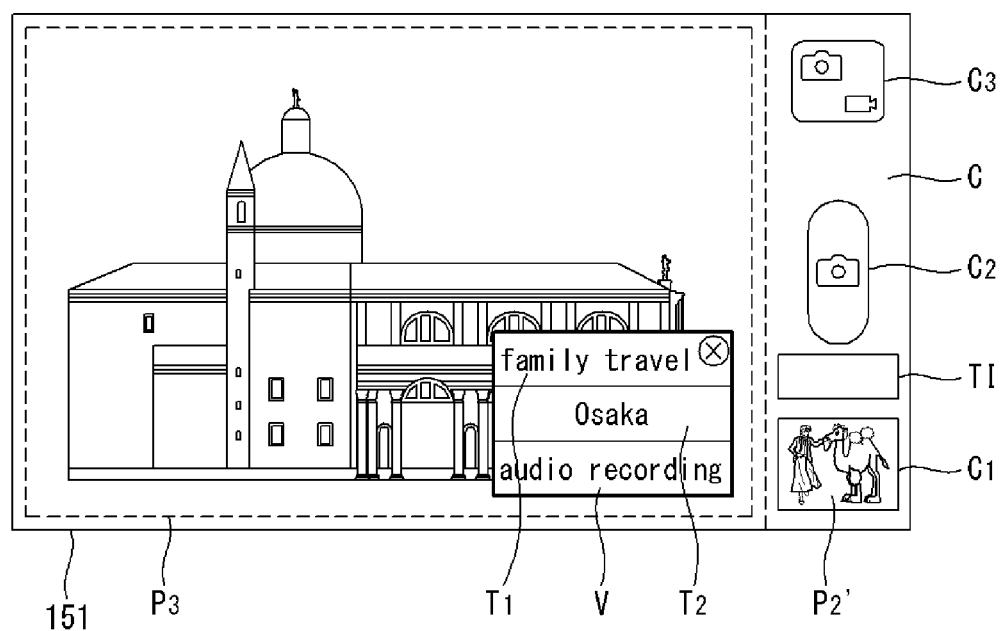

When two images are captured in a row after one-time photographing in FIG. 6, a plurality of captured images may be grouped to generate an image group, as shown in FIG. 7. The controller 180 may recommend a title of the generated image group.

Referring to FIG. 7, the controller 180 may display a list of one or more candidate titles T1 and T2 in the preview image region. The candidate titles T1 and T2 may include location information acquired by the electronic device 100, the date when the images are captured, information set by the user, etc.

The controller 180 may recommend at least one candidate title that can identify a group including a plurality of images and display the candidate title on a preview image as a pop-up.

The controller 180 may display a title input box TI into which a selected title can be input in the control region C and, at the same time, recommend the candidate titles. The controller 180 may display the title input box TI above the region C1 for displaying a thumbnail image of a lastly captured image.

The location of the title input box TI is not limited to the above-described position and may be displayed in a region of the displayed user interface for image capture, shown in FIG. 7. For example, the title input box TI can be displayed in the preview image region.

Referring to FIG. 7, the candidate titles displayed as a pop-up may include a control item V for audio recording. Upon selection of the item V for audio recording, the controller 180 can record the voice of the user during image capture (including video capture).

Figure 8:
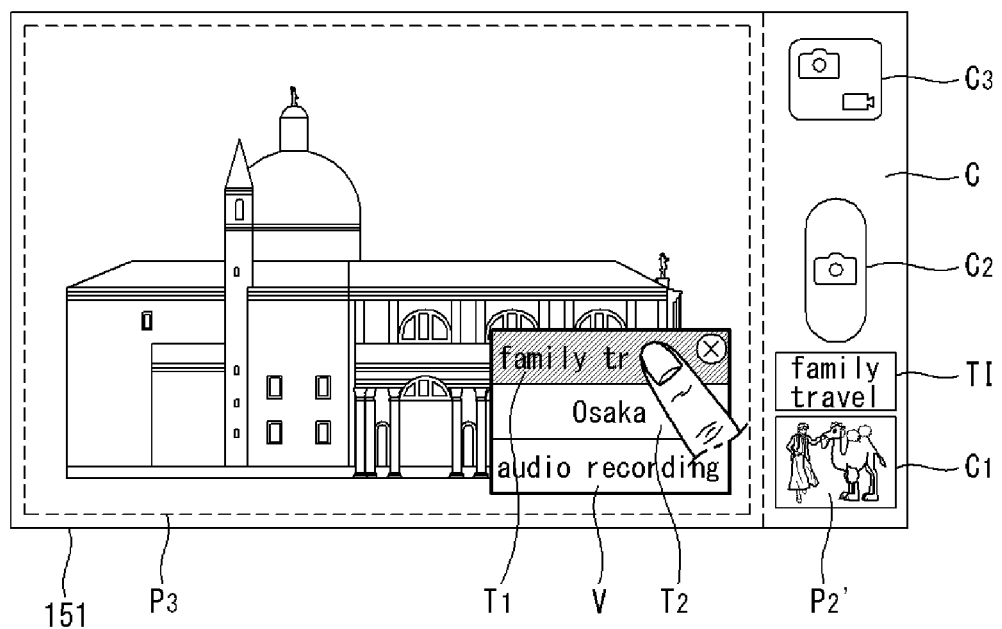

Referring to FIG. 8, upon reception of an input for selecting one (e.g. family travel) of candidate titles T1, T2 and V, the controller 180 may display the selected title (family travel) in the title input box TI.

Accordingly, the user can recognize that the currently captured image is categorized as a group corresponding to the title "family travel" and stored through the title displayed in the title input box disposed above the region C1 for displaying a thumbnail image of a lastly captured image.

Figure 9:
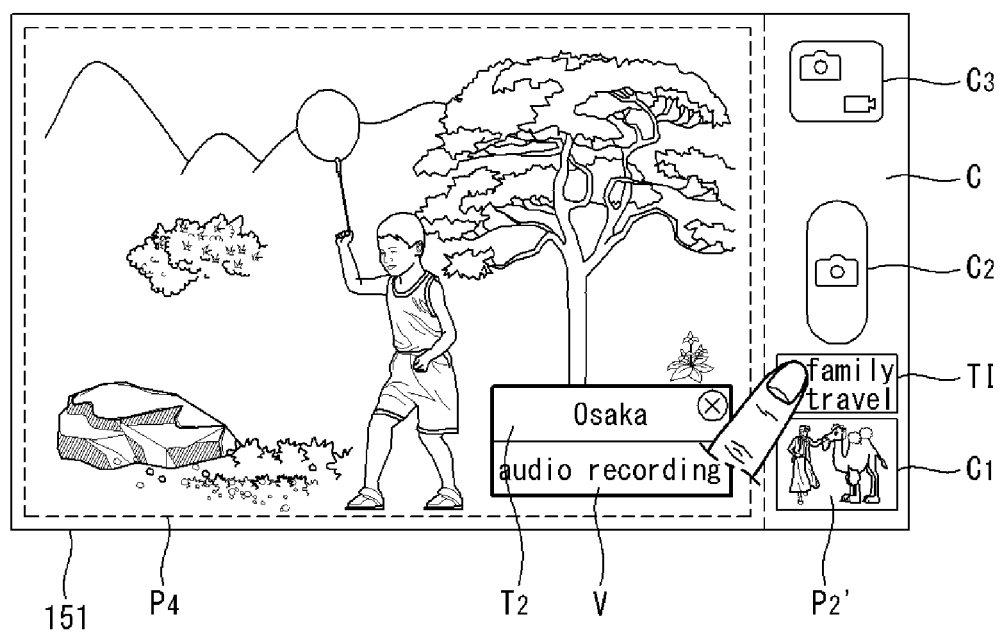

Referring to FIG. 9, upon reception of a touch input for selecting the title input box TI, the controller 180 may re-display the candidate title list in the preview image region such that the title displayed in the title input box TI can be corrected.

The controller 180 controls the candidate title list to disappear from the preview image after a predetermined lapse of time from when the candidate title list is re-displayed.

Figure 10:
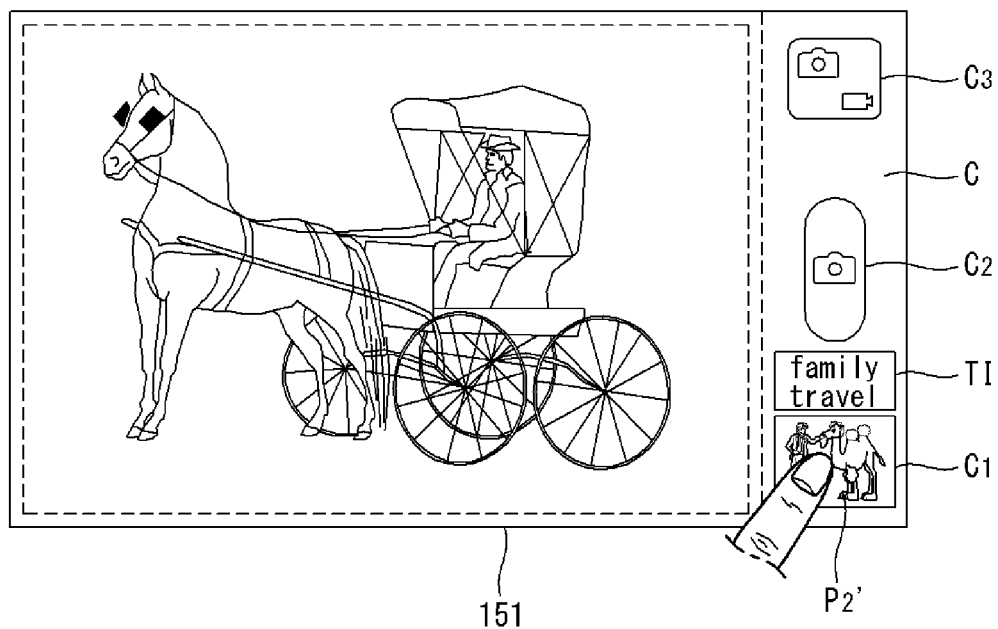
FIGS. 10 and 11 are views illustrating an example of accessing a group image when a title is provided to the group image according to an embodiment of the present invention.
Figure 11:
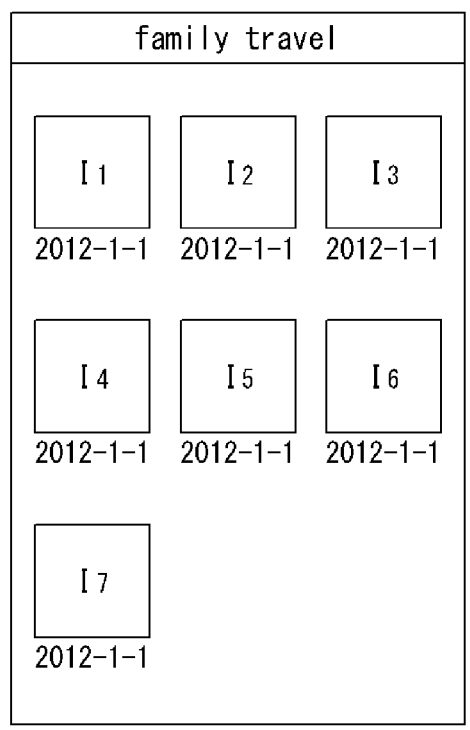

FIGS. 10 and 11 are views illustrating an example of accessing an image group when the image group is given a title according to an embodiment of the present invention.

Referring to FIGS. 10 and 11, upon reception of an input for selecting the region C1 for displaying a thumbnail image of a lastly captured image while the title is given to the image group and displayed in the title input box TI, the controller 180 may display images included in the image group on the touchscreen 151. That is, the controller 180 may display a plurality of images I1, I2, I3, I4, I5, I6 and I7 belonging to a family travel group on the touchscreen 151 as a group.

Referring back to FIG. 10, when an input for selecting the region C1 for displaying a thumbnail image of a lastly captured image is received in a state that the title input box TI is not provided, an image captured through the camera and stored is displayed on the touchscreen 151. However, when the input for selecting the region C1 for displaying a thumbnail image of a lastly captured image is received in a state that an image group satisfying a predetermined condition is generated and the title of the image group is displayed in the title input box TI according to the embodiment of the present invention, only images included in the group may be selected and displayed on the touchscreen 151.

As described above, when the camera is operated to capture a predetermined number of times in a row in a specific place, the predetermined number of captured images are grouped as one group. According to an embodiment of the present invention, a title for identifying the group of the plurality of images can be recommended and thus the user may not group one or more images from among a plurality of images as a group and set a title of the group.

According to an embodiment of the present invention, it is possible to enable the user to manage captured images easily and efficiently by recommending an appropriate candidate title of an image group in consideration of an environment in which the images are captured.

A description will be given of an example of accessing a group of images when a plurality of images is displayed on the touchscreen.

Figure 12:
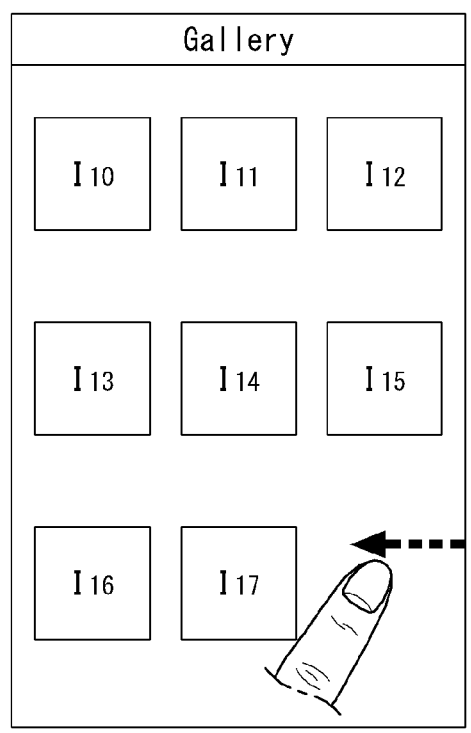
FIGS. 12, 13 and 14 are views illustrating another example of accessing a group image when a title is provided to the group image according to an embodiment of the present invention.
Figure 13:
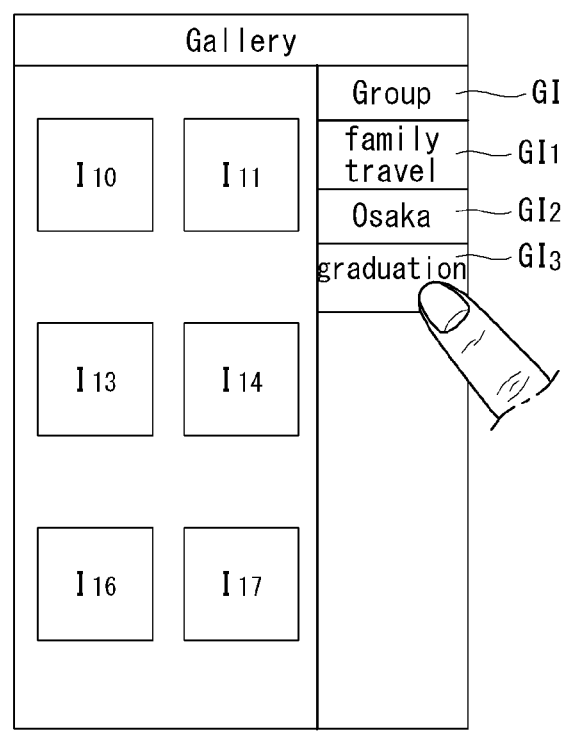
Figure 14:
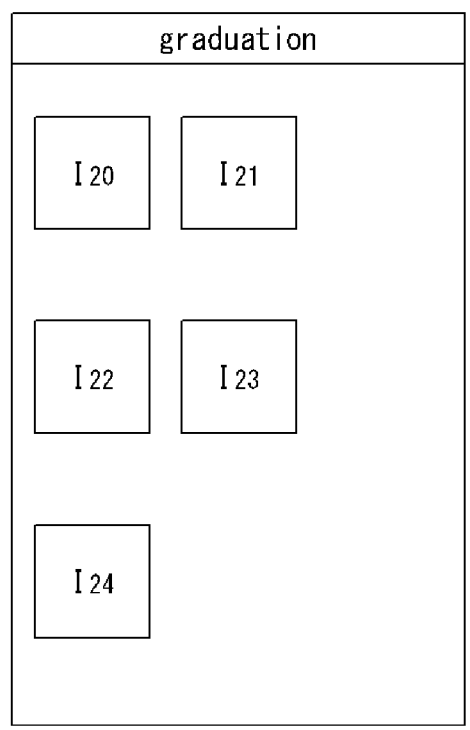

FIGS. 12, 13 and 14 are views illustrating another example of accessing an image group when the image group is given a title according to an embodiment of the present invention.

Referring to FIG. 12, when at least one image group is previously set and stored in the memory, the controller 180 may display a plurality of images I10, I11, I12, I13, I14, I15, I16 and I17 on the touchscreen 151. Upon reception of a slide input starting at one side of the touchscreen 151, the controller 180 may display a bar including representative titles GT1, GT2 and GT3 of currently set image groups on the touchscreen 151 according to the slide input. Upon selection of 'graduation' GT3 from among 'family travel' GT1, 'Osaka' GT2 and 'graduation' GT3 displayed in the bar, images I20, I21, I22, I23 and I24 captured in a graduation ceremony may be displayed on the touchscreen 151 as an image group.

Figure 15:
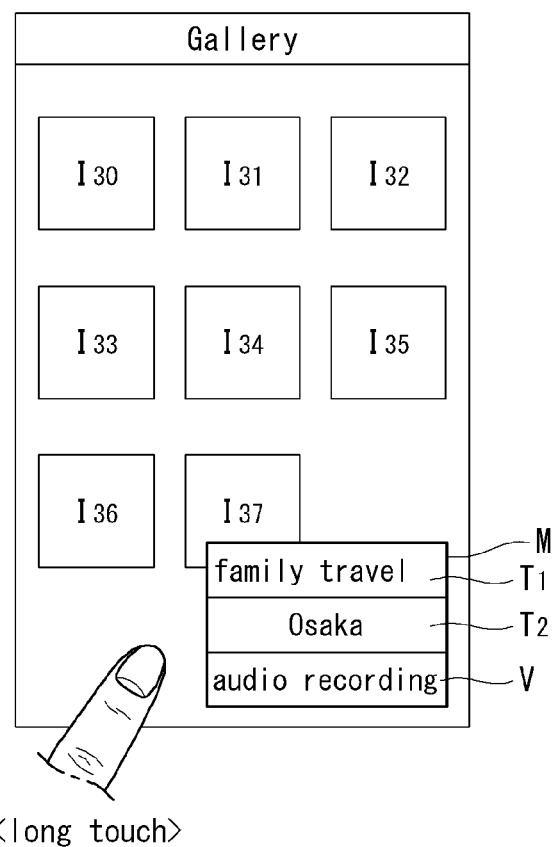
FIGS. 15 and 16 are views illustrating an example of providing a group title to a plurality of images displayed on the touchscreen.
Figure 16:
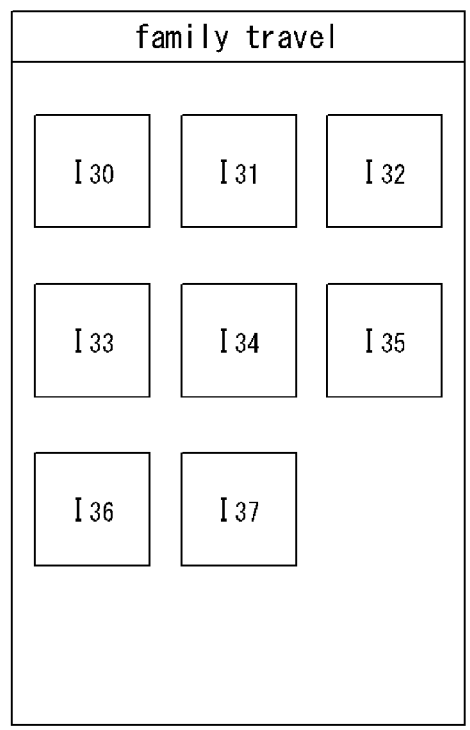

FIGS. 15 and 16 are views illustrating an example of providing a group title to a plurality of images displayed on the touchscreen.

Referring to FIG. 15, when a plurality of images I30, I31, I32, I33, I34, I35, I36 and I37 captured by the camera is displayed on the touchscreen 151, the controller 180 may provide a list M of candidate titles T1 and T2 to be mapped to the images I30, I31, I32, I33, I34, I35, I36 and I37 as a pop-up in consideration of the date when the images I30, I31, I32, I33, I34, I35, I36 and I37 are captured, background of the images, the place where the images are captured, etc. upon reception of a long-touch input applied to a region of the touchscreen 151.

Upon selection of "family travel" T1 as a representative title from the pop-up, the controller 180 may group the images I30, I31, I32, I33, I34, I35, I36 and I37 as a "family travel" group and display the images.

Figure 17:
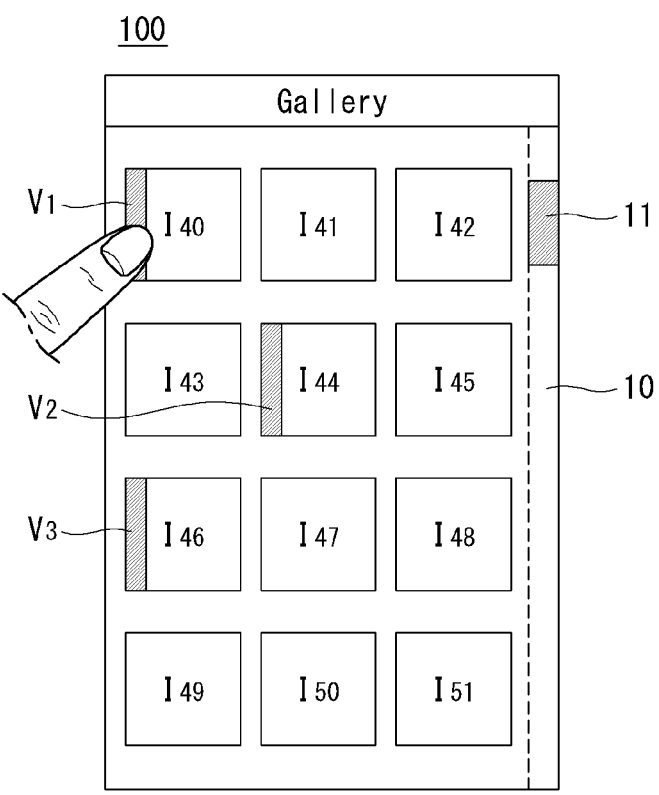
FIG. 17 is a view illustrating an indicator for identifying an image given a group image when a plurality of images is displayed on the touchscreen.

FIG. 17 is a view illustrating an example of identifying images given a title of an image group when a plurality of images is displayed on the touchscreen.

Referring to FIG. 17, the controller 180 may display a plurality of images I40, I41, I42, I43, I44, I45, I46, I47, I48, I49, I50 and I51, captured by the camera, as thumbnail images on the touchscreen 151.

The images I40, I41, I42, I43, I44, I45, I46, I47, I48, I49, I50 and I51 may include one or more group images I40, I44 and I46. The controller 180 may change display characteristics of the thumbnail images I40, I44 and I46 to indicate that the images I40, I44 and I46 are grouped. The controller 180 may change display characteristics of the thumbnail images I40, I44 and I46 to indicate that the images I40, I44 and I46 are grouped and mapped to a group title. In FIG. 17, change of the display characteristics is represented as V1, V2 and V3.

The controller 180 may display a scroll bar 11 for controlling display of the images I40, I41, I42, I43, I44, I45, I46, I47, I48, I49, I50 and I51 in a scroll region 10. It is possible to display a plurality of other thumbnail images on the touchscreen 151 by moving the scroll bar 11.

Figure 18:
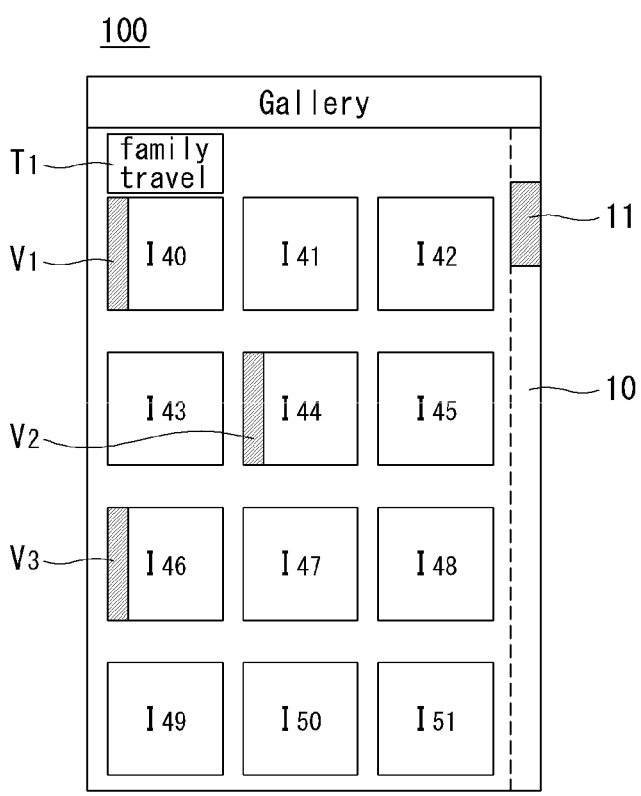
FIGS. 18, 19 and 20 are views illustrating an example of controlling display of a group image using the indicator shown in FIG. 17.
Figure 19:
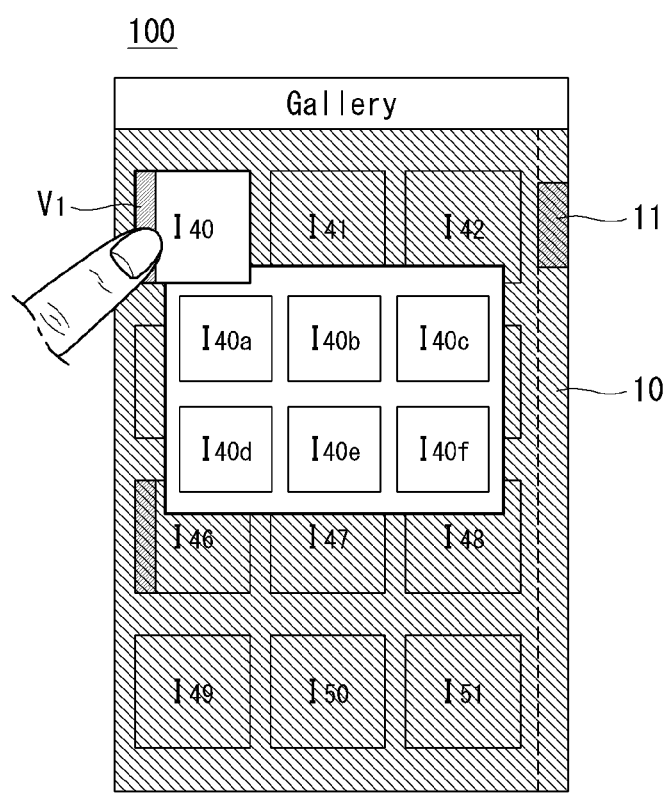
Figure 20:
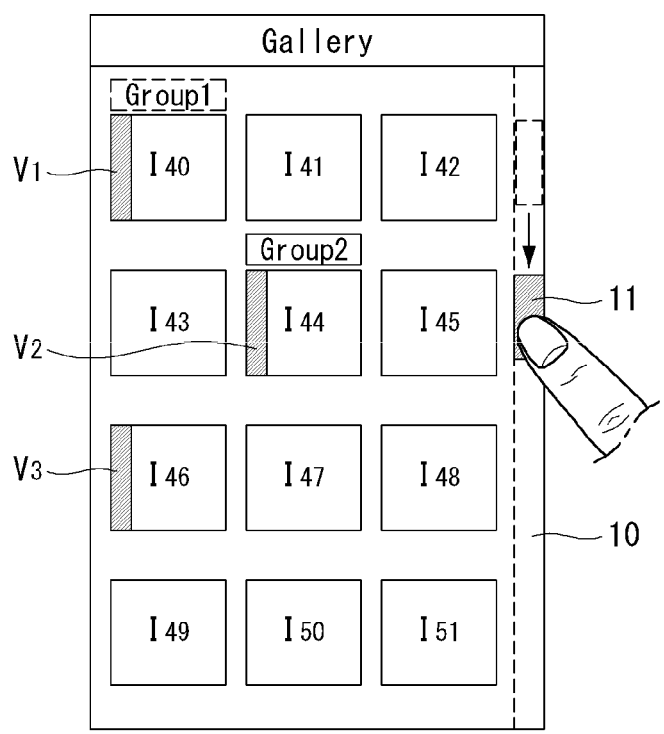

FIGS. 18, 19 and 20 are views illustrating an example of controlling display of grouped images through identification of the grouped image, illustrated in FIG. 17.

Referring to FIG. 18, upon reception of an input for selecting a first grouped image I10, the controller 180 may display the group title TI (family travel) corresponding to the first image group I40 on the top of the first image group I40. The display position of the group title T1 is not limited thereto. The input for selecting the first image group I40 may include a touch input applied to a portion representing a visual characteristic for indicating that the first image group I40 is mapped to a group title.

Referring to FIG. 19, upon reception of the input for selecting the first image group I40, a plurality of images I40a, I40b, I40c, I40d, I40e and I40f corresponding to the first image group I40 may be displayed on the touchscreen 151.

Referring to FIG. 20, upon scroll down of the scroll bar 11, the controller 180 may display a group title (e.g. I44, Group2) of a image group when the scroll bar 11 passes the region in which the image group is located.

Figure 21:
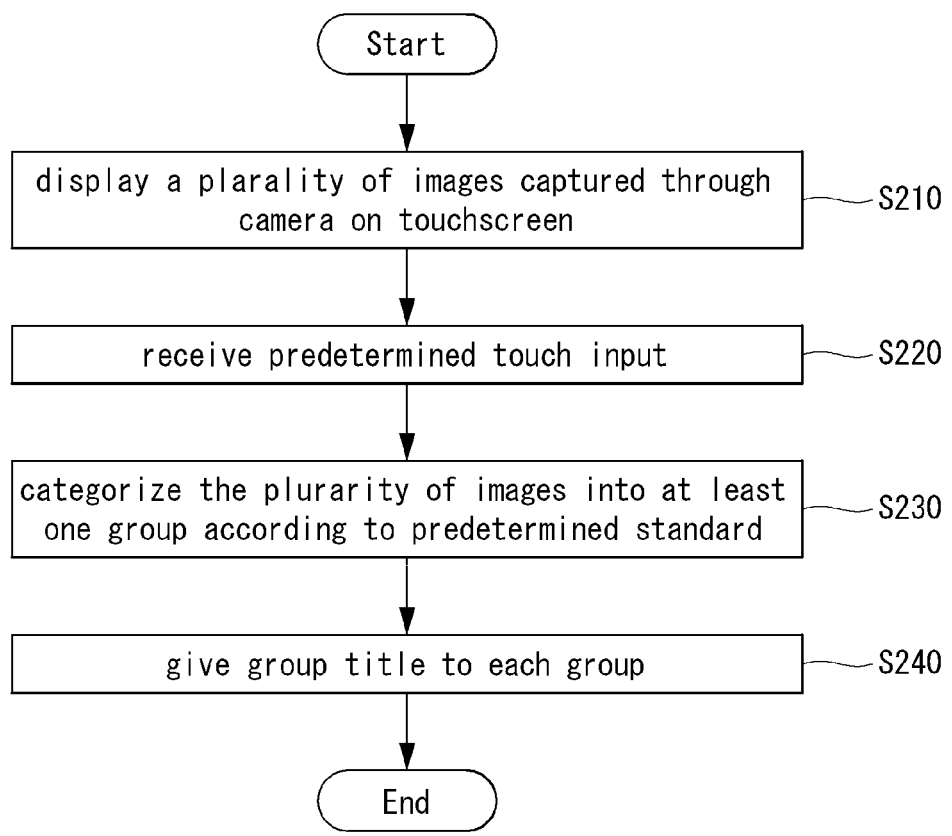
FIG. 21 is a flowchart illustrating a method of controlling an electronic device according to another embodiment of the present invention.

FIG. 21 is a flowchart illustrating a method of controlling an electronic device according to another embodiment of the present invention.

The method of controlling an electronic device according to another embodiment of the present invention may be implemented in the electronic device 100 described above with reference to FIGS. 1 and 2. The method of controlling an electronic device and operations of the electronic device 100 to implement the method will now be described with reference to the attached drawings.

Referring to FIG. 21, the controller 180 may display a plurality of images captured through the camera on the touchscreen 151 (S210).

The controller 180 may receive a predetermined touch input (S220). The predetermined touch input is a multi-touch input and may include a pinch zoom-in or pinch zoom-out input. The predetermined touch input is not limited to the pinch input and may be modified in various manners.

The controller 180 categorizes the plurality of images into at least one group according to a predetermined standard (S230).

The predetermined standard may include a date when images are captured, a place where the images are captured, a person who is photographed, a standard set by the user etc.

The controller 180 may give a title to each group (S240).

The embodiment illustrated in FIG. 21 will now be described in more detail with reference to the attached drawings.

FIGS. 22 to 28 are views illustrating the embodiment shown in FIG. 21.

Figure 22:
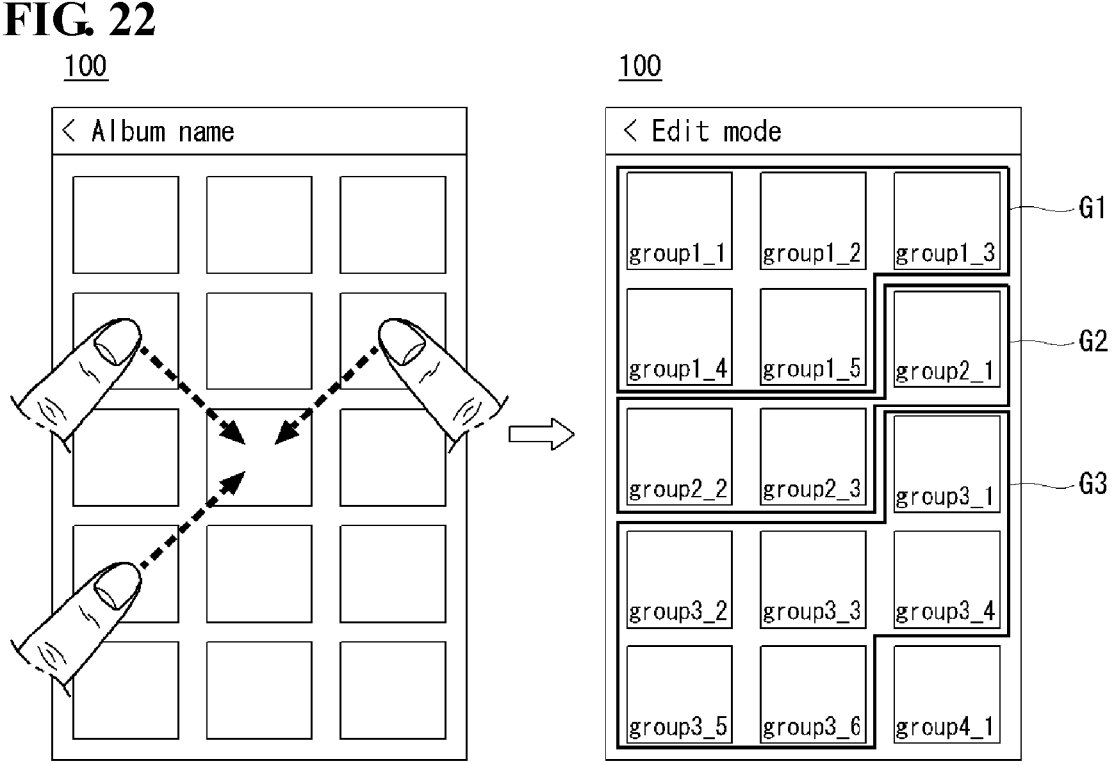

FIG. 22 is a view illustrating an example of grouping a plurality of images according to a predetermined standard in response to a predetermined touch input when the plurality of images is displayed on the touchscreen.

Referring to FIG. 22, the predetermined touch input may be multiple touches including three touch points. Upon reception of a pinch zoom-in input applied to the touchscreen on which the plurality of images is displayed, the controller 180 may group the plurality of images into three groups G1, G2 and G3 and display the image groups G1, G2 and G3.

The controller 180 may discriminate the groups G1, G2 and G3 from one another by changing display characteristics of boundaries of the groups G1, G2 and G3.

The controller 180 may set group titles for individual images included in each group and display the group titles. For example, Group1_1, Gruop1_2, Group1_3, Group1_4 and Group1_5 may be respectively tagged to images included in the first group G1, as shown in FIG. 22. Images included in the second and third groups G2 and G3 are tagged in the same manner. The method of tagging group titles to individual images of each group is not limited thereto and may be modified in various manners.

Figure 23:
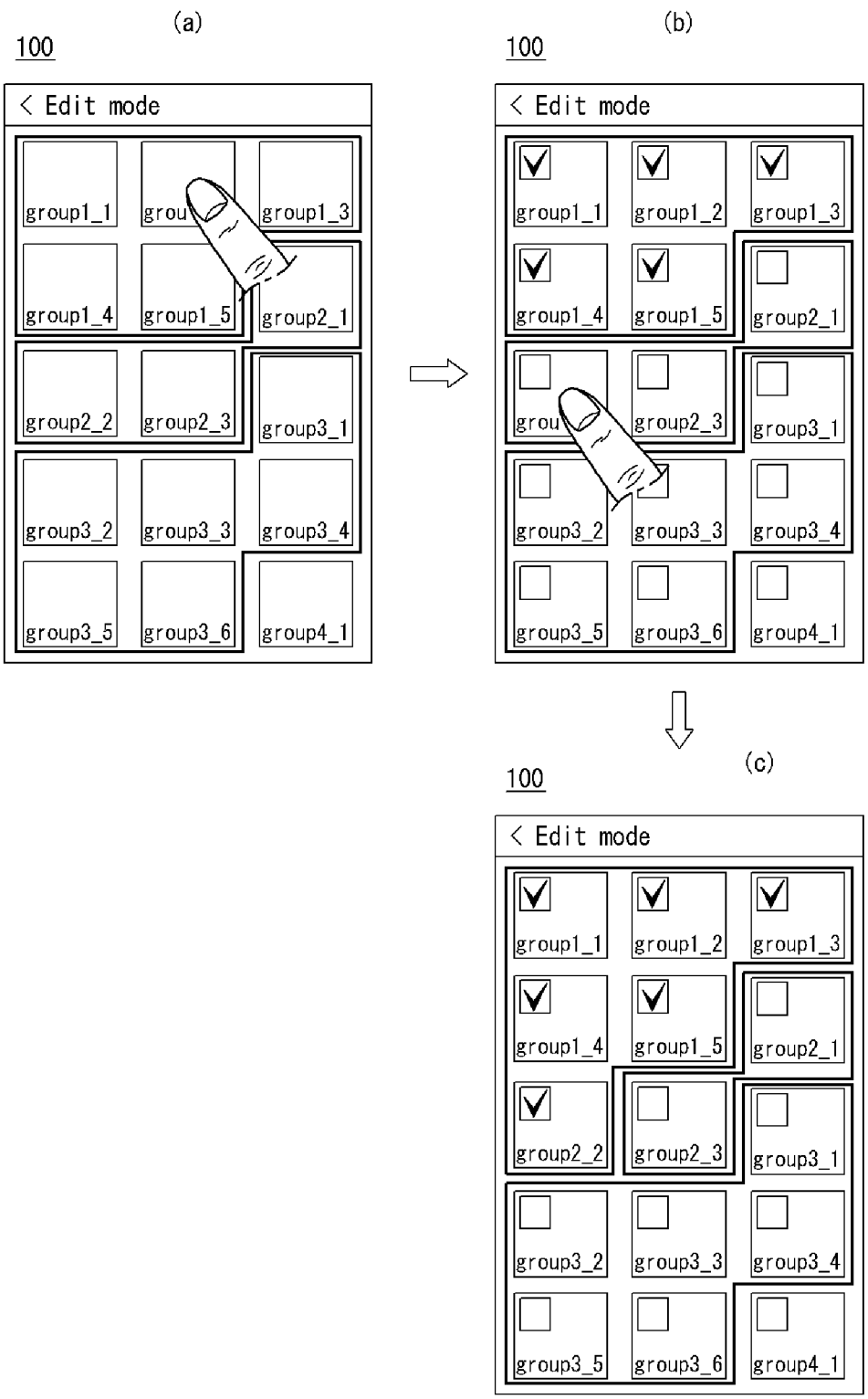

FIG. 23 is a view illustrating an example of correcting a grouping state of an image group.

Referring to FIG. 23, upon reception of a touch input for selecting the first group G1, the electronic device 100 enters a mode in which individual images of each group can be selected. Upon selection of all images belonging to the first group and then reception of an input for adding a second image Group2_2 of the second group to the first group, the controller 180 may transfer the second image Group2_2 of belonging to the second group to the first group.

Figure 24:
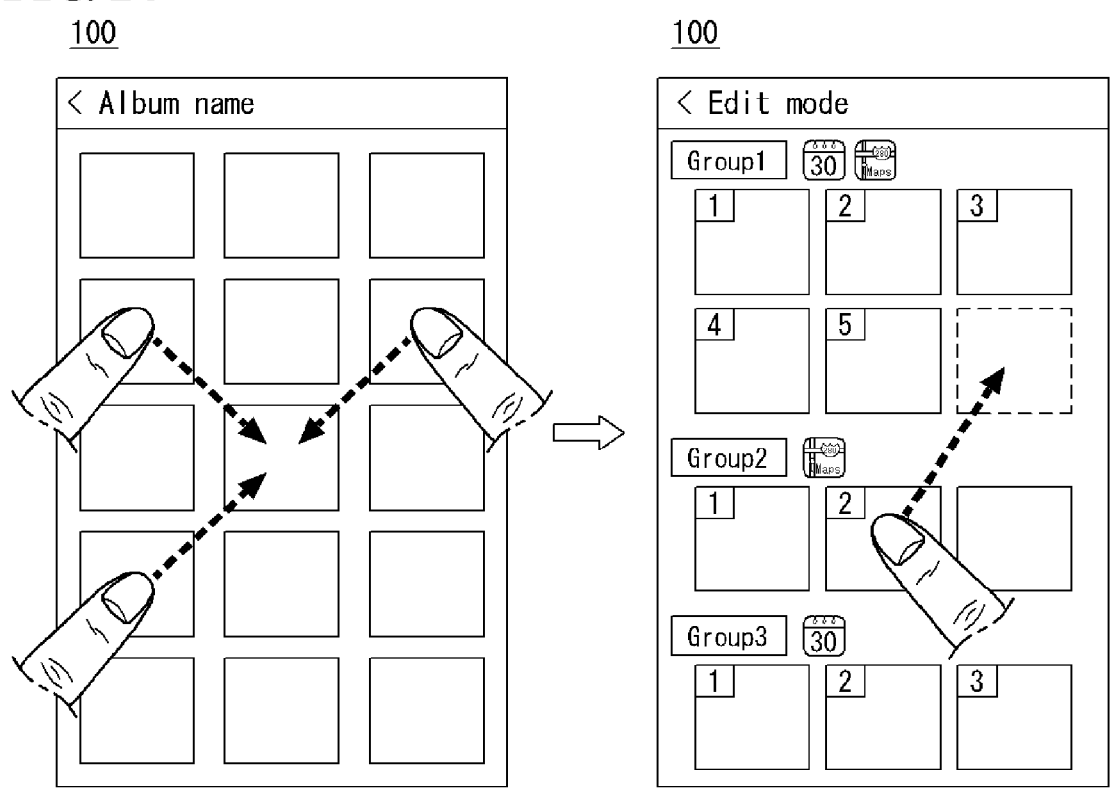

FIG. 24 is a view illustrating an example of grouping a plurality of images into one or more groups on the basis of a predetermined standard according to a predetermined touch input and displaying the groups on the touchscreen when the plurality of images is displayed on the touchscreen.

Referring to FIG. 24, the controller 180 may categorize the plurality of images into three groups G1, G2 and G3 and display the groups G1, G2 and G3 upon reception of a multi-touch input. Titles Group1, Group2 and Group3 of the groups G1, G2 and G3 may be predetermined. The controller 180 may categorize the plurality of images based on the titles of the groups. For example, the first group Group1 includes five images and the second group Group2 includes two images.

The controller 180 may display, around each group, an indication icon (e.g. calendar icon, map icon, etc.) for indicating the standard of image grouping. Accordingly, the user can recognize the standard of grouping images into a specific group at a glance.

For example, the user can be aware that images of the first group are categorized on the basis of the date when the images are captured and the place where the images are captured and images of the second group are categorized on the basis of the date when the images are captured.

FIGS. 25 and 26 are views illustrating an example of changing a grouping standard, grouping a plurality of images displayed on the touchscreen based on the changed grouping standard and displaying image groups on the touchscreen.

Referring to FIG. 25, the controller 180 may change a grouping level according to a multi-touch zoom-in input. For example, upon reception of a multi-touch zoom-in input applied to first, second, third and fourth groups, the controller 180 may edit the four groups into three or less groups. For example, the controller 180 can combine groups corresponding to touch points of the multi-touch zoom-in input into one group. Referring to FIG. 25, upon reception of a multi-touch zoom-in input having touch points corresponding to the first, second and third groups, the controller 180 can combine the first, second and third groups into a first group.

As the groups are combined, indication icons used to indicate grouping standards of the groups may also be combined.

The controller 180 may separate the combined group upon reception of a multi-touch zoom-out input applied to the combined group.

Touch inputs for combining groups and separating a combined group are not limited to the above-described multi-touch zoom-in and multi-touch zoom-out input and may be modified in various manners.

Referring to FIG. 26, upon reception of a multi-touch zoom-out input applied to first, second, third and fourth image groups displayed on the touchscreen, the controller 180 may display all the images included in the groups as thumbnail images instead of displaying the images based on group titles. In this case, the controller 180 may change a display characteristic of grouped images given a group title (e.g. shadow edges of the grouped images).

FIGS. 27 and 28 are views illustrating an example of aligning group images based on the grouping standard and displaying the aligned group images according to an embodiment of the present invention.

In FIGS. 27 and 28, a plurality of images having different sizes may be aligned on the basis of a predetermined alignment standard.

Referring to FIGS. 27 and 28, the controller 180 may align the group images on the basis of grouping standards, for example, the date when images are captured, the place where the images are captured, photographed people, etc. in a group image edition mode. Referring to FIG. 28, upon selection of the date when the images are captured, the controller 180 may subdivide the grouping standard into a day and a month when the images are captured and align the group images based on the subdivided standards.

Referring to FIGS. 27 and 28, a plurality of images may be displayed on the touchscreen 151. The plurality of images may include at least one group image given a group title.

The controller 180 may display indicators for indicating the grouping standards, for example, the date when the images are captured, the place where the images are captured, photographed people, etc. on the touchscreen 151 in the group image edition mode. Upon reception of an input for selecting one of the indicators, the controller 180 may align the plurality of images displayed on the touchscreen 151 on the basis of the grouping standard corresponding to the selected indicator. For example, when an icon corresponding to the date when the images are captured is selected as the grouping standard corresponding to the selected indicator, as illustrated in FIG. 27, the controller 180 may align the plurality of images based on the date when the images are captured.

Upon selection of the date when the images are captured as the grouping standard, the controller 180 may align the group images based on the day and month when the images are captured.

The controller 180 may align the plurality of group images based on the dates when the group images are captured and, at the same time, display images included in each group as thumbnail images having sizes depending on the number of images included in each group. For example, if a group includes a large number of images, the images can be displayed as large thumbnail images. While a thumbnail image may be displayed in a size of "1×1" as a default size, the thumbnail image can be displayed in various sizes such as "1×2", "2×1", "2×2", "3×3", etc.

As described above, the embodiments of the present invention can group images displayed on the touchscreen based on a predetermined standard, give a group title to each group and modify configuration and arrangement of group images displayed on the touchscreen in various manners.

The method for controlling of the mobile terminal according to embodiments of the present invention may be recorded in a computer-readable recording medium as a program to be executed in the computer and provided. Further, the method for controlling a mobile terminal according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD, ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device, comprising:
   a touchscreen configured to display information; and
   a controller configured to:
      control the touchscreen to display a plurality of captured images,
      group the plurality of captured images into one or more groups based on one or more of at least one predetermined standard in response to a touch input received via the touchscreen, and
      assign a title to each group based on the one or more of the at least one predetermined standard.

2. The electronic device of claim 1, wherein the at least one predetermined standard comprises at least a location where the images of each group were captured or a date when the images of each group were captured.

3. The electronic device of claim 1, wherein the title comprises at least a location where the images of each group were captured or a date when the images of each group were captured.

4. The electronic device of claim 1, wherein the touch input comprises a pinch-in touch input.

* * * * *